H. C. LAMDIN.
DRINKING FOUNTAIN FOR FOWLS.
APPLICATION FILED SEPT. 9, 1910.

1,014,490.

Patented Jan. 9, 1912.

Witnesses

Inventor
H. C. Lamdin.

By

Attorneys

UNITED STATES PATENT OFFICE.

HERBERT C. LAMDIN, OF EGG HARBOR CITY, NEW JERSEY.

DRINKING-FOUNTAIN FOR FOWLS.

1,014,490.   Specification of Letters Patent.   Patented Jan. 9, 1912.

Application filed September 9, 1910. Serial No. 581,133.

*To all whom it may concern:*

Be it known that I, HERBERT C. LAMDIN, a citizen of the United States, residing at Egg Harbor City, in the county of Atlantic, State of New Jersey, have invented certain new and useful Improvements in Drinking-Fountains for Fowls; and I do hereby declare the following to be a full, clear, and exact description of the invention, such as will enable others skilled in the art to which it appertains to make and use the same.

This invention relates to drinking fountains and particularly to that type employed in watering pigeons.

The object of the invention resides in the provision of a drinking fountain of the character named which will prevent the deposit of filth therein, thereby maintaining the water free from pollution and safeguarding the health of the fowls.

With the above and other objects in view the invention consists in the details of construction and in the arrangement and combination of parts as will be hereinafter more fully described and particularly pointed out in the appended claims.

Figure 1:
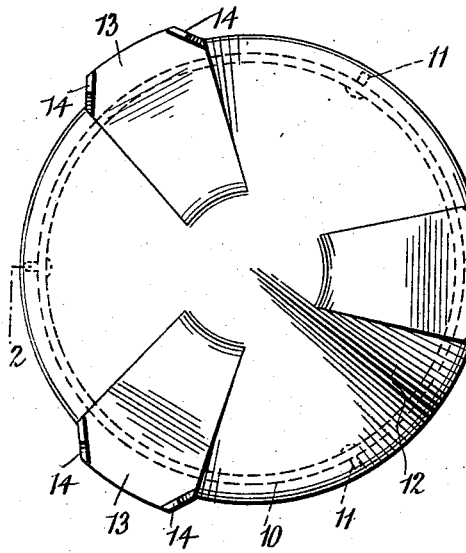
Figure 2:
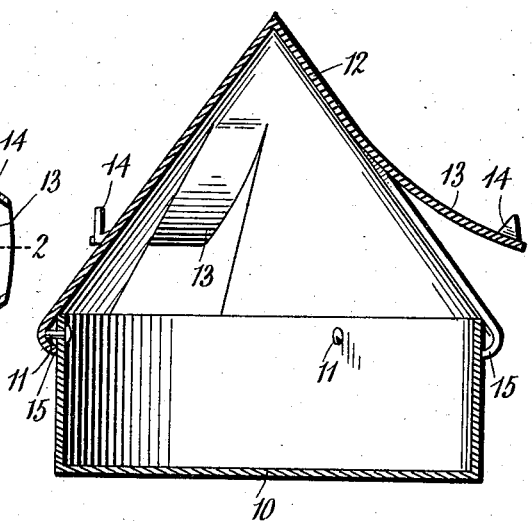
Figure 3:
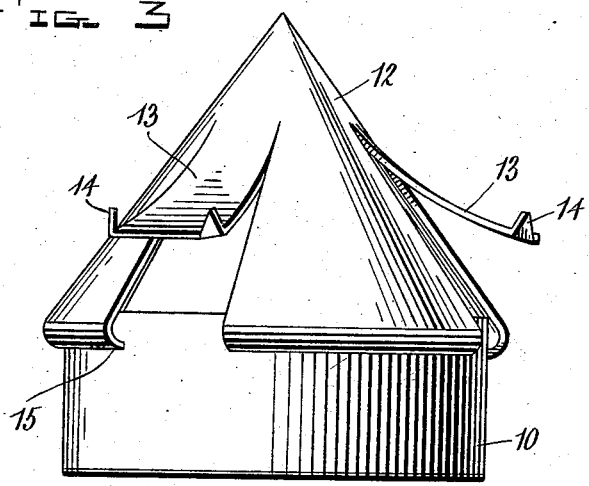

In describing the invention in detail reference will be had to the accompanying drawings wherein like characters of reference denote corresponding parts in the several views; and in which, Figure 1 is a plan view of a drinking fountain constructed in accordance with the invention; Fig. 2, a section on the line 2—2 of Fig. 1; and, Fig. 3, a side elevation of the fountain.

Referring to the drawings, 10 indicates a cylindrical basin provided with a plurality of spaced lateral projections 11. Disposed over the basin 10 and resting upon the upper edge thereof is a conical cover 12 which is slitted longitudinally to form a plurality of spaced tongues 13. These tongues 13 are bent outwardly from the body portion of the cover 12 so as to extend beyond the limits of the basin 10, and have their outer ends bent upwardly at their terminals as at 14. The openings left by bending the tongues 13 outwardly serve to permit the entrance of the forward portion of the body of the fowl when the latter desired to drink. The inclined surface of the cover 12 and the tongues 13 will prevent the fowl from alighting thereon, while the upturned portions 14 will likewise serve to deter the fowls from attempting to alight on the outer ends of the tongues 13. The base of the cover 12 is bent inwardly as at 15 so as to be disposed beneath the projections 11 when the cover is in a given position whereby the basin and cover are held in interlocking engagement. However, it will be apparent that upon a rotation of the cover 12 the projections 11 will move into the recesses formed by the outward bending of the tongues 13 and when so disposed the cover 12 can be lifted from the basin 10 to permit cleaning of the latter.

What is claimed is:

In a drinking fountain for fowls, the combination with a basin, of a conical cover seated upon the upper end of said basin, said cover being provided with a plurality of spaced slits extending longitudinally thereof and opening through its lower end to form a plurality of tongues, said tongues being bent outwardly of the cover in alternation and having the ends of their free terminals bent upwardly at an angle to the remainder of the tongue, and means for detachably securing the cover upon the basin.

In testimony whereof, I affix my signature, in presence of two witnesses.

HERBERT C. LAMDIN.

Witnesses:
CHAS. T. CAST,
FRANK HOFF.

Copies of this patent may be obtained for five cents each, by addressing the "Commissioner of Patents, Washington, D. C."